Figure 1:
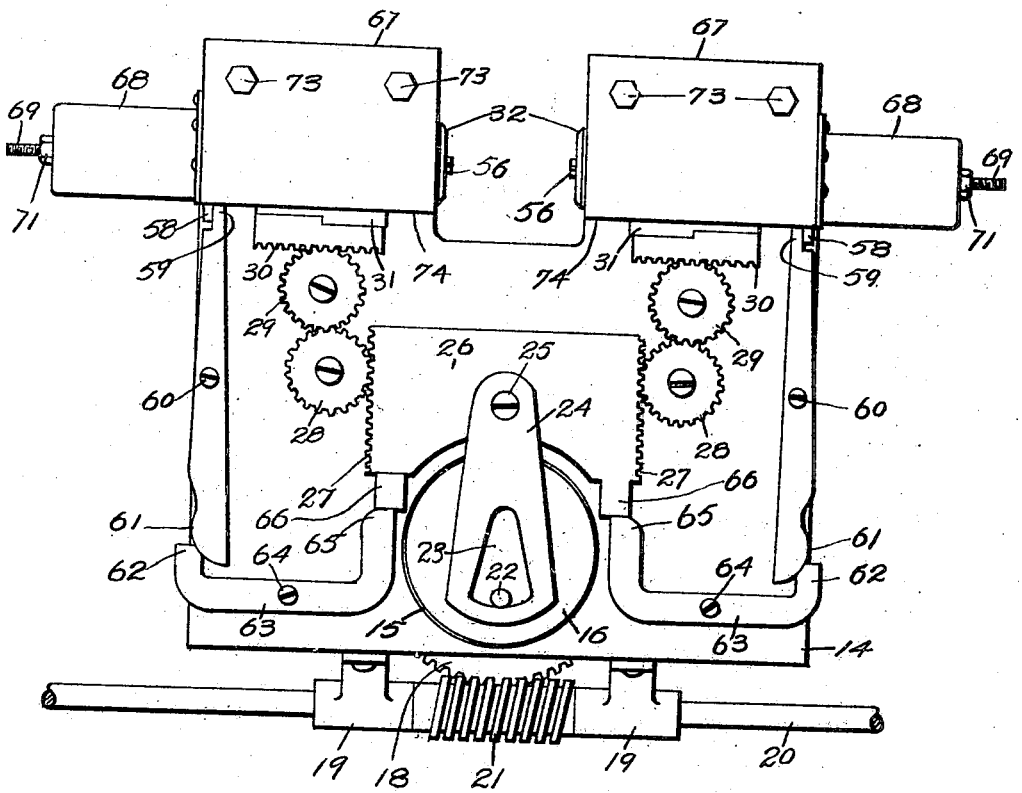

A. R. MANESS.
NUTCRACKER.
APPLICATION FILED JULY 2, 1921.

1,417,272.

Patented May 23, 1922.
3 SHEETS—SHEET 1.

INVENTOR
ARTHUR R. MANESS
BY Edward E. Lingan
ATTY.

A. R. MANESS.
NUTCRACKER.
APPLICATION FILED JULY 2, 1921.
1,417,272.
Patented May 23, 1922.
3 SHEETS—SHEET 2.
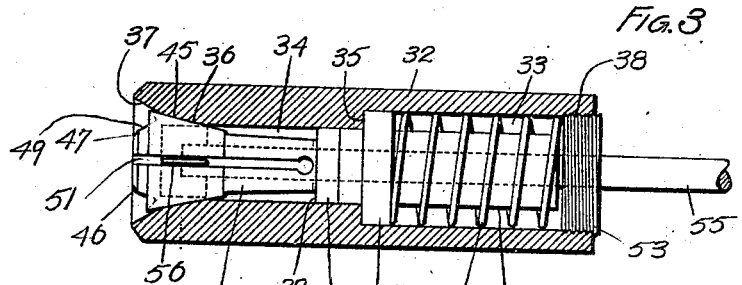
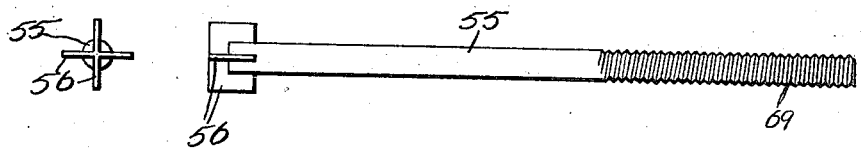
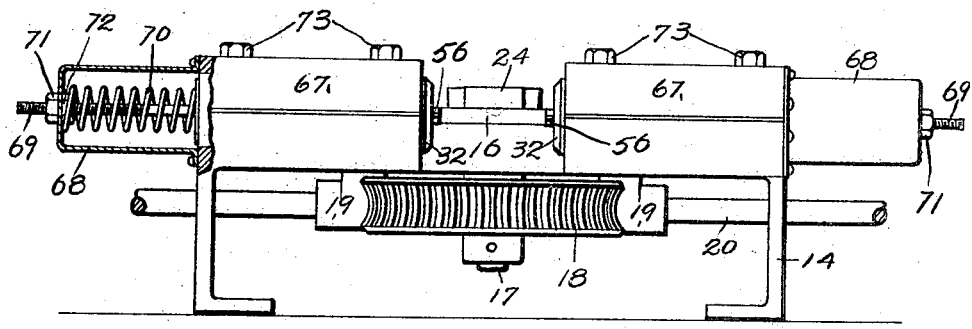
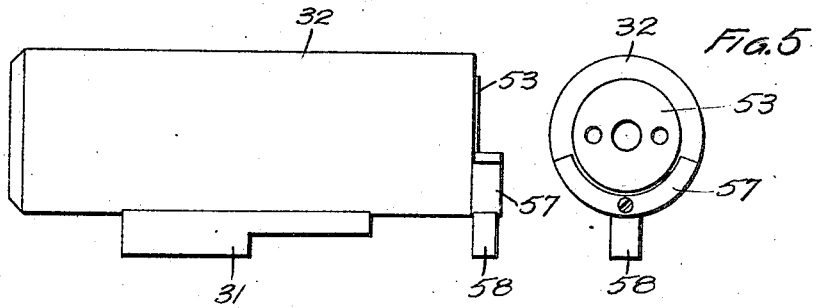
INVENTOR
ARTHUR R. MANESS
By Edward E. Longan
ATTY.

A. R. MANESS.
NUTCRACKER.
APPLICATION FILED JULY 2, 1921.

1,417,272.

Patented May 23, 1922.
3 SHEETS—SHEET 3.

INVENTOR
ARTHUR R. MANESS
BY Edward E. Longan
ATTY.

UNITED STATES PATENT OFFICE.

ARTHUR R. MANESS, OF ST. LOUIS, MISSOURI.

NUTCRACKER.

1,417,272.   Specification of Letters Patent.   Patented May 23, 1922.

Application filed July 2, 1921. Serial No. 482,148.

*To all whom it may concern:*

Be it known that I, ARTHUR R. MANESS, a citizen of the United States, and resident of the city of St. Louis and State of Missouri, have invented certain new and useful Improvements in Nutcrackers, of which the following is a specification containing a full, clear, and exact description, reference being had to the accompanying drawings, forming a part hereof.

My invention relates to improvements in nut crackers and has for its primary object a nut cracker for cracking pecans and the like which pinches off the ends of the shell and then spreads the balance of the shell away from the kernel before cracking it, so that the kernel can be removed in its entirety.

A further object is to construct a nut cracker having a pair of reciprocating sleeves in which are mounted collets, the collets being adapted to pinch off the ends of a nut shell and then force away and break the balance of the shell so that the kernel will not be broken. Each collet is provided with a cleaning member so that the pinched off ends of the shell can be readily removed from the collet.

In the drawings,

Fig. 1 is a top plan view of a nut cracker embodying my invention.

Fig. 2 a front elevation of the same.

Fig. 3 a longitudinal section of one of the sliding sleeves showing the collet and cleaning rod located therein.

Fig. 4 a side elevation of one of the sleeves.

Fig. 5 a rear end view of the same.

Figure 6:
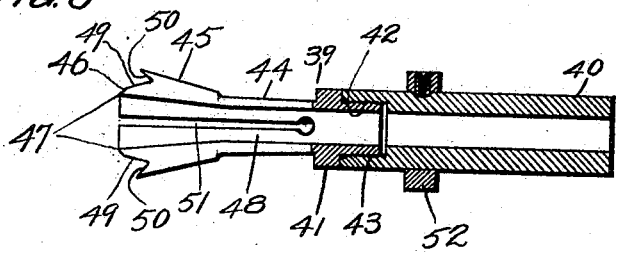

Fig. 6 a longitudinal sectional view of the collet.

Figure 7:
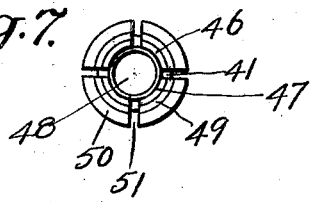
Figure 10:
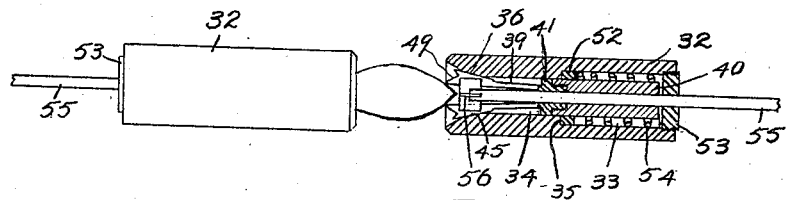
Figure 11:
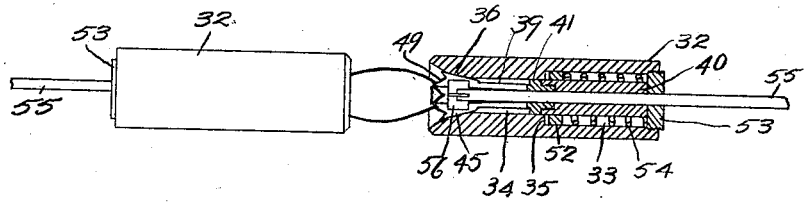
Figure 12:
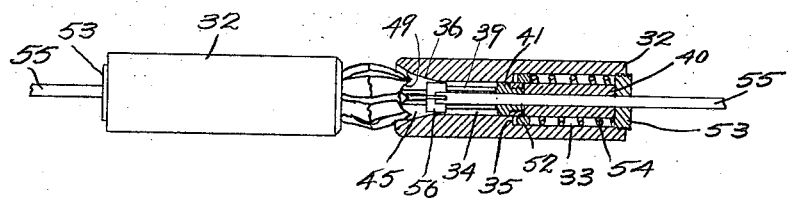
Figure 13:
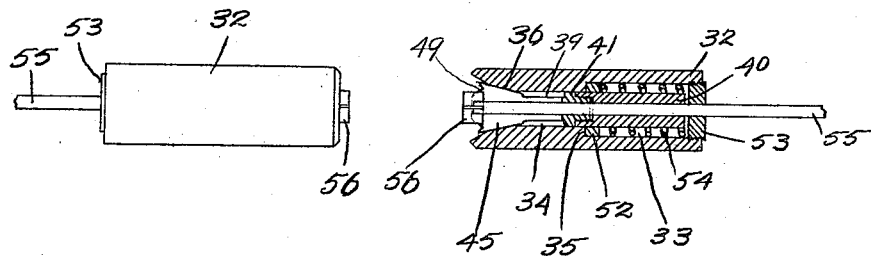

Fig. 7 a front view of the same.

Fig. 8 a side elevation of the cleaning rod.

Fig. 9 a front view of the same.

Figs. 10, 11, 12 and 13, diagrammatic views showing the positions of the sleeves, collets and cleaning rods during the operation of cracking a nut.

In the construction of my device I employ a frame 14. This frame is provided with a circular recess 15 and in this recess is mounted a disc 16. The disc 16 is provided with a shaft 17, which shaft projects through the frame 14 and has the worm wheel 18 secured thereto. The worm 18 being located below the frame 14. Secured to the frame 14 are bearings 19 in which is mounted a shaft 20. Mounted on the shaft and located between the bearings 19 is a worm 21 which meshes with the worm wheel 18, so that when the shaft 19 is rotated, the worm wheel 18 will be placed in rotation and this in turn rotates the disc 16. The shaft 20 is placed in rotation in any suitable manner, either by means of a crank, by a belt and pulley, or by being directly connected to a motor. Projecting from the upper surface of the disc 16 is a pin 22. This pin projecting into a slot 23 formed near one end of the lever 24. The lever 24 is pivoted at the point indicated by the numeral 25 to a plate 26 which is slidably mounted on the base 14. Secured to each side of the plate 26 is a rack 27, which meshes with the gear 28. This gear being pivotally secured to the frame 14. The gear 28 in turn meshes with the gear 29 which is also secured to the frame 14. The gear 29 meshes with a rack 30. This rack is secured to the projection or lug 31 which is either formed integral with or secured to the sleeve 32. The sleeve 32 is provided with the concentric bores 33 and 34. The bore 34 being smaller than the bore 33, so that the shoulder 35 is formed. The bore 34 is provided with the inclined faces 36 and 37, while the bore 33 is provided with screw threads 38. Located within the bores 33 and 34 is the pincer collet or cracking member. In the machine shown herein this consists of two members, 39 and 40, the former comprising a pincer head and the latter a stem or shank through which the pincer head receives its motions. Both of these members are provided with a central bore. The member 39 is provided with a collar 41. To one side of this collar is formed a screw-threaded projection 42 which is adapted to be secured within the screw threaded recess 43 formed in the portion 40. To the other side of the collar 41 is formed a shank 44 which terminates in a flaring portion 45 which constitutes the pincer head proper. This flaring portion has its outside so shaped as to conform with the tapered portion 36 formed in the bore 34 of the sleeve 32. The forward edge of the portion 45 is provided with an inclined face 46 making a sharp edge 47 where the inclined face 46 and the bore 48 formed in the portion 39 meet. Adjacent the inclined face 46 is an inclined face 49 which is for the purpose of forcing the nut shell away from the kernel after the end has been pinched off by means of the sharp edge 40. Joining the outer tapered face of the enlargement 45 and the inclined portion 49 is an inclined face 50. The meeting of these two faces forming an angle or shoulder so that when the nut shell has traveled up the inclined portion 49 it will come in contact with this angle or shoulder and as the operation of the device proceeds, will tend to bulge the nut shell at the center and thus crack it away from the kernel. The pincer head consists of a number of segments, formed by the slots 51, which are adapted to be forced toward each other by the inclined faces 36 of the sleeve 32 as the latter is moved forward. Located on the portion 40 is a collar 52 which is designed to rest against the shoulder 35 and located within the screw-threaded portion 38 is a screw-threaded plug 53. Interposed between the collar 52 and the plug 53 is a coil spring 54. The purpose of this is to force the collet forward in the sleeve so that it may spring apart, or in other words, open. Located in the bore formed in the members 39 and 40 is a cleaning rod which consists of the screw-threaded rod 55 to one end of which is secured a cleaning member which consists of plates 56 arranged at right angles to each other. These plates extending in the slots 51 formed in the collet. Secured to the end of the sleeve 32 is a lug 57. Its projecting end 58 adapted to contact with one end of the lever 59. This lever 59 is pivoted to the frame 14 at the point indicated by the numeral 60. Its other end being provided with a rounded surface 61. This rounded surface contacts with the end 62 of a U-shaped lever 63. This U-shaped lever is pivoted to the frame 14 at the point 64 and has its opposite end 65 contacting with the projection 66 formed on the plate 24. The sleeves 32 are slidable mounted in boxes 67 which are formed intgeral with the frame. Secured to the boxes 67 are housings 68. These housings are each closed at one end which is provided with an opening through which the screw-threaded end 69 and cleaning rod 58 projects. The cleaning rod is encircled by a coil spring 70, one end of which rests against the closed end of the housing 68, the other end pressing against the screw-threaded plug 53. The cleaning rod is held against movement within the sleeve by means of nuts 71 and 72, placed on either side of the closed end of the housing 68. This makes the cleaning rod adjustable as to the distance which it extends into the collet. The boxes 67 and their caps are so constructed as to meet on their rear edges and are secured together by means of bolts 73, while their front edges 74 remain spaced apart so that the projections 31 and 58 can operate therein.

My purpose in forming the boxes in this manner is to obviate the necessity of cutting a slot in the forward edges of the boxes to permit the aforesaid projections to pass there through.

The operation of my device is as follows:

The device being in the position shown in Fig. 1, the shaft 20 is placed in operation. This causes the disc 16 to revolve, carrying with it the pin 22 which operates in the slot 23. This slot is preferably pear shaped as illustrated in the drawing, but may be of any other desired shape. The nut is held in position between the sleeves 32; as the disc continues to revolve, the pin 22 has a circular movement. The springs 70 are under compression when the sleeves are in this position. After the pin 22 has revolved a certain distance it is released from contact with the lower or small end of the slot 23. The springs now exert pressure against the screw-threaded plugs 53 and cause the sleeves 32 to travel forward rapidly so that the sharp edges of the collets will strike the ends of the nut. The device now remains in this position until the pin 22 strikes the large end or the enlarged portion of the slot 23, this forces the plate 26 toward the sleeves. This movement of the plate 26 is in turn imparted to the gears 28 and 29 and from there to the racks 30. The movement is then transferred to the sleeves 32 which commence to move forward, carrying with them the collets. The collets are able to move only a small distance due to the nut being placed between them, but the continued movement of the plate 26 causes the sleeve 32 to move forward on the collet. This compresses the collet and pinches off each end of the nut. When this pinching has been accomplished the end of the member 40 has come in contact with the screw-threaded plug 53 and the collet is carried forward with the sleeve, although no more compression takes place on the collet. The sharpened edge 47 is now driven through the shell and the portion of the shell between the collets arises on the inclined surfaces 46 and 49, until it comes in contact with the shoulder formed by the inclined faces 49 and 50. The continued forward movement of the sleeves now causes the shell to buckle in the center and due to its curved shape, this buckling takes place outwardly or away from the kernel. After a slight amount of this buckling, the shell cracks and springs away from the kernel, allowing only the kernel and the two pinched off ends to still be held in the machine. At this period the pin 22 commences to descend in the slot 23 and when it has reached the lower or reduced end of the slot it moves the gears 28 and 29 in the opposite direction and commences to slowly withdraw the sleeves, thus releasing the nut. The pinched off ends, however, frequently remain within the collets. After this releasing has taken place, the projections 66 contact with the end 65 of the lever 63 and forces the ends 65 downward. This causes a rise in the end 62 of the lever 61 and due to its contact with the curved end 61 of the lever, forces this end inwardly or towards the disc while the end 59 is moved downwardly. This end being in contact with the lug or projection 58 forces the sleeves 32 outward rapidly. This rapid movement is permitted by preferably constructing the gear 29 as a mutilated gear, that is, removing a number of teeth from a portion of its periphery so that the rack 30 will be free to move without exerting any force on the gear 29. This forward pull by means of the lever mechanism compresses the spring 70 and draws the sleeves 32 back far enough so that the cleaning end 56 of the cleaning rod 55 projects beyond the outer edge of the collet. This is clearly illustrated in Fig. 13. This forces the pinched off ends of the shell out of the collet and the device is ready for the next nut.

It will be seen that when the sleeve 32 is moved forward, relative to the pincer head, causing the nipping sections thereof to close and pinch off the end of the nut, the pincer collet is contracted in size so that the edge 47 thereof lies inside the inner rim of the hole formed through the shell of the nut by pinching off its end, and that upon the forward movement of the collet it enters the shell inside said edge of the hole therein, rather than engaging directly with such edge. The result is that the shell is not broken up around the hole and the pieces thereof forced into the meat of the nut, but rather the end of the pincer head enters freely into the hole until the inclined surface 49 thereof engages with the inside of the shell, forcing it, first, away from the nut meat, and then cracking it at its longitudinal central portion as the collet moves forward with the edge of the shell in engagement with the shoulder at 50.

I do not desire to limit myself to the precise construction shown for operating the sleeves as this may be done in various ways and either by a rotary movement communicating with a rack and pinion movement or by a lever mechanism designed to be operated by hand or power or by means of cams. Neither do I desire to limit myself to feeding the device by hand as this may be done mechanically without departing from the spirit of my invention.

Having fully described my invention what I claim is:

1. A nut cracker comprising a frame, sleeves slidably mounted in said frame, pincer collets slidably mounted in said sleeves, said collets adapted to pinch off the ends of the nut and then spread the shell away from the kernel.

2. A nut cracker comprising a frame, a pair of sleeves mounted in said frame, a pincer collet slidably secured in each sleeve, said collets adapted to pinch off both ends of the nut and then spread the shell away from the kernel thereof, and means for moving said sleeves to and from each other.

3. A nut cracker comprising a frame, sleeves slidably mounted in said frame, pincer collets mounted in said sleeves, said collets adapted to pinch off the ends of the nut and then spread the shell away from the kernel, and means for removing the pinched off ends of the nut shell from the collets.

4. A nut cracker comprising a frame, a pair of sleeves mounted in said frame, a pincer collet slidably secured in each sleeve, said collets adapted to pinch off both ends of the nut and then spread the shell away from the kernel thereof, means for moving said sleeves to and from each other, and means for removing the pinched off ends of the nut shell from the collets.

5. A nut cracker comprising a frame, pincer heads supported therein, means for advancing the pincer heads toward each other to engage with the ends of a nut, means for causing the pincer heads to contract to pinch off the ends of the nut with which they have come into engagement, and means for advancing the said heads into the holes formed by pinching off the ends of the nut and for spreading the shell away from the kernel and breaking it.

6. In a nut cracker a pincer collet provided with a combined pinching and cutting edge by which the end of a nut shell may be pinched off and means for causing the said collet to be contracted after coming into engagement with the nut end.

7. In a nut cracker a segmental pincer collet provided with a combined pinching and cutting edge, means for causing the segments of the collet to approach each other when in engagement with a nut to pinch off the ends thereof, and means carried by the collet for removing the pinched off ends of a nut shell.

8. In a nut cracker a pincer collet adapted to pinch off the ends of a nut and means operating after the ends of the nut have been pinched off to spread the remainder of the shell away from the kernel.

9. In the nut cracker of claim 8 provided with means located within the collet for removing the pinched off ends of the nut shell.

In testimony whereof, I have signed my name to this specification.

ARTHUR R. MANESS.